(12) United States Patent
Ionescu et al.

(10) Patent No.: US 11,467,123 B2
(45) Date of Patent: Oct. 11, 2022

(54) DOUBLE-GATE FIELD-EFFECT-TRANSISTOR BASED BIOSENSOR

(71) Applicant: ECOLE POLYTECHNIQUE FEDERALE DE LAUSANNE (EPFL), Lausanne (CH)

(72) Inventors: Mihai Adrian Ionescu, Ecublens (CH); Hoël Guerin, Lausanne (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 277 days.

(21) Appl. No.: 16/645,081

(22) PCT Filed: Sep. 8, 2017

(86) PCT No.: PCT/EP2017/072661
§ 371 (c)(1),
(2) Date: Mar. 6, 2020

(87) PCT Pub. No.: WO2019/048059
PCT Pub. Date: Mar. 14, 2019

(65) Prior Publication Data
US 2020/0284753 A1 Sep. 10, 2020

(51) Int. Cl.
*H01L 29/00* (2006.01)
*G01N 27/414* (2006.01)

(52) U.S. Cl.
CPC ................ *G01N 27/4145* (2013.01)

(58) Field of Classification Search
CPC ......... H01L 29/66477; H01L 29/78648; H01L 29/66484; H01L 29/7831; H01L 51/0093;
(Continued)

(56) References Cited

U.S. PATENT DOCUMENTS 4,180,771 A 12/1979 Guckel
5,466,348 A * 11/1995 Holm-Kennedy ..........................
G01N 27/4145
204/414

(Continued)

FOREIGN PATENT DOCUMENTS

KR 20160013768 A 2/2016
WO 2016085126 A1 6/2016

OTHER PUBLICATIONS

Office Action from corresponding EP Application No. 17764586.8, dated Mar. 9, 2022.
(Continued)

*Primary Examiner* — Samuel Park
(74) *Attorney, Agent, or Firm* — Maschoff Brennan

(57) ABSTRACT

A biosensor includes a source element; a drain element; a semiconductor channel element between the source element and the drain element for forming an electrically conductive channel with adjustable conductivity between the source and drain elements; a first gate element configured to be electrically biased to set a given operational regime of the sensor with given electrical conductivity of the channel; and a second gate element, physically separate from the first gate element, configured to contact a solution comprising analytes allowed to interact with a gate contact surface of the second gate element to generate a surface potential change dependent on the concentration of the analytes in the solution. The channel element is substantially fully depleted allowing the first and second gate elements to be electrostatically coupled such that the surface potential change at the second gate element is configured to modify the electrical conductivity of the channel.

12 Claims, 3 Drawing Sheets

(58) Field of Classification Search
CPC .......................... H01L 29/66; G01N 27/4145; G01N 27/4148; G01N 27/414; G01N 33/54373; G01N 33/48707; G01N 33/5438; G01N 27/403; G01N 27/333; G01N 33/543

See application file for complete search history.

(56) References Cited

U.S. PATENT DOCUMENTS

| | | |
|---|---|---|
| 7,101,762 B2 | 9/2006 | Cohen et al. |
| 2011/0108892 A1* | 5/2011 | Monfray ............ G01N 33/5438 257/253 |
| 2011/0299337 A1 | 12/2011 | Parris et al. |
| 2013/0200438 A1 | 8/2013 | Liu et al. |
| 2017/0023518 A1 | 1/2017 | Rowe et al. |

OTHER PUBLICATIONS

Bae et al., "Enhanced Sensing Properties of Fully Depleted Silicon-on-Insulator-Based Extended-Gate Field-Effect Transistor with Dual-Gate Operation" Applied Physics Express, vol. 6, No. 12, Nov. 13, 2013, pp. 127001:1-4.

Jang et al. "Performance Enhancement of Capacitive-Coupling Dual-gate Ion-Sensitive Field-Effect Transistor in Ultra-Thin-Body" Scientific Reports, vol. 4, No. 1, Jun. 13, 2014.

\* cited by examiner

DOUBLE-GATE FIELD-EFFECT-TRANSISTOR BASED BIOSENSOR

TECHNICAL FIELD

The present invention relates to a biosensor, such as an ion-sensitive field-effect transistor (ISFET), chemical field-effect transistor (ChemFET) or field-effect transistor-based biosensor (BioFET). The invention also relates to a fabrication method of the sensor.

BACKGROUND OF THE INVENTION

One of the first types of field-effect transistor biochemical sensors, ion-sensitive field-effect transistors, were first introduced by Bergveld in the early 70s. They provided a semiconductor alternative to the glass electrodes for pH and ion measurements. In its simplest form, an ISFET is comparable to a planar a metal-oxide-semiconductor field-effect transistor (MOSFET) except that the gate electrode directly in contact with the gate dielectric is instead replaced by a reference electrode acting as a local gate immersed in a solution contacting the gate dielectric. Alternatively, a metal layer and/or a functionalisation layer may cover (fully or partially) the gate dielectric and be in contact with the solution. Ions or charged molecules or analytes in the solution generate a surface potential at the solution—gate dielectric interface. If this contribution is significant enough at the ISFET surface, it can modify the gate potential and contribute to the electrostatic control of the transistor channel thus affecting the source to drain current to be sensed. In particular, adsorbed charged molecules produce a surface potential $\varphi_0$ on the gate oxide resulting in a threshold voltage $V_{th}$ change of the ISFET. For a fixed reference electrode potential $V_{Ref}$, only the surface potential $\varphi_0$ changes as a function of the concentration of the charged molecules. $V_{Ref}$ is usually set to a fixed value to operate the transistor in subthreshold slope regime, which provides higher sensitivity.

In order to make accurate measurements of the concentration of charged molecules, the ISFETs need to have the potential of the reference electrode maintained at a stable value. However, any variation or drift in the long term of this potential (notably via oxidation reduction (redox) reactions with the chemical species of the solution) generates an offset error. This is the reason why a reference electrode and not a simple (noble) metal electrode is usually used in ISFETs. A reference electrode has by definition a stable and well-known electrode potential. The high stability of the electrode potential is usually reached by employing a redox system with constant (buffered or saturated) concentrations of each participant of the redox reaction. Typical reference electrodes are standard hydrogen electrodes, calomel electrodes, or silver-silver chloride electrodes. They are usually bulky (with a size of a pen), require maintenance and are difficult to miniaturise. Especially smaller sized reference electrodes are unstable over time and require frequent recalibration.

SUMMARY OF THE INVENTION

It is an object of the present invention to overcome at least some of the problems identified above relating to biosensors.

According to a first aspect of the invention, there is provided a biosensor.

The proposed new solution has the advantage that the sensor can be easily miniaturised and it is stable, ie it does not need frequent calibrations. Furthermore, the sensor is inexpensive. This means that even if a large number of sensors is manufactured, the manufacturing costs can be kept low. Optionally, there is no need for a separate reference electrode contrary to the prior art solutions. This would further lower the manufacturing costs.

According to a second aspect of the invention, there is provided a wearable device comprising the biosensor according to the first aspect of the present invention.

According to a third aspect of the invention, there is provided a method of fabricating the biosensor.

Other aspects of the invention are recited in the dependent claims attached hereto.

BRIEF DESCRIPTION OF THE DRAWINGS

Other features and advantages of the invention will become apparent from the following description of non-limiting example embodiments, with reference to the appended drawings, in which.

DETAILED DESCRIPTION OF EMBODIMENTS OF THE INVENTION

Figure 1:
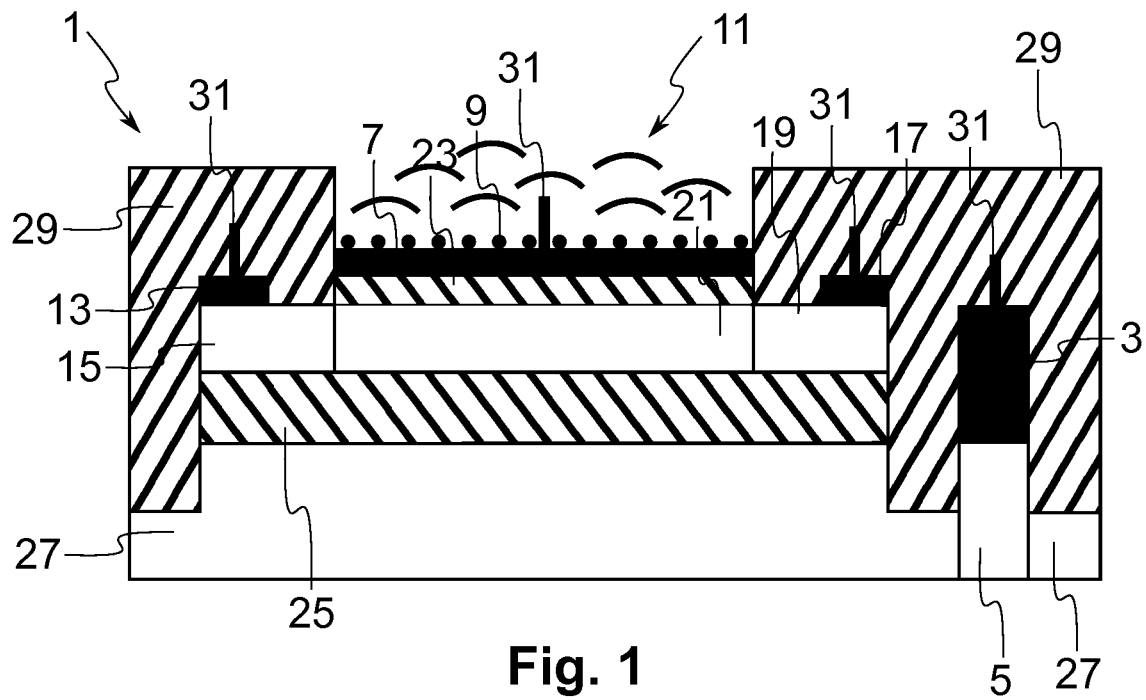
FIG. 1 is a simplified cross-sectional view of a biosensor according to a first embodiment of the present invention.

Some embodiments of the present invention will now be described in detail with reference to the attached figures. These embodiments are described in the context of a multi-gate ion-sensitive field-effect transistor, but the teachings of the invention are not limited to this environment. The teachings of the invention are equally applicable in other multi-gate biological or chemical (including biochemical) sensors, referred to as biosensors, operating as described below. Identical or corresponding functional and structural elements which appear in the different drawings are assigned the same reference numerals.

FIG. 1 is a schematic cross-section view of a multi-gate sensor 1, also referred to as a device, comprising two physically independent or separate gates according to the first embodiment of the present invention. In the present description, by a multi-gate device is understood a device comprising at least two gate elements, nodes, terminals or regions. Thus, the device of FIG. 1 could comprise more than two gates. The biosensor 1 of FIG. 1 comprises a field-effect transistor (FET) exposed to a liquid solution. As can be seen in FIG. 1, the transistor comprises a first gate element, referred to as a back gate, comprising a back gate electrode 3 or electrical contact and a back gate doped region 5 in direct contact with the back gate electrode 3. The transistor also comprises a second gate element, referred to as a front gate, in this example comprising a front gate electrode 7 or electrical contact. In the present description, the electrical contacts are metal conductors, but they could instead be any conductive elements, such as conductive polysilicon contacts. In this example, the front gate, or more specifically its optional functionalisation layer 9 provided on the front gate, is arranged to be in contact with a solution (a fluid) 11 with a given analyte or biological component or chemical constituent (including for example ions or charged atoms or molecules) concentration. The functionalisation layer 9, also known as a sensor or probe material layer, may be used for selective detection of the properties of the analytes of interest. It is to be noted that the front gate and the back gate are physically independent of each other.

A conductive channel, also known as a FET channel, can be formed between a source element, node, terminal or region and a drain element, node, terminal or region. The source element, referred to also as a source, comprises a source electrode 13 or electrical contact in direct contact with a source doped region 15, while the drain element, referred to also as a drain, comprises a drain electrode 17 or electrical contact in direct contact with a drain doped region 19. These two doped regions are of the same type, namely either of n or p type. The conductive channel can be formed in a channel element 21, which in this example is a thin or ultra-thin silicon (Si) body (in this example with a thickness smaller than 50 nm). A first insulator 23 or a first dielectric layer is placed between the channel element 21 and the front gate contact 7. A second insulator 25 or a second dielectric, in this example a buried oxide layer or more specifically an ultra-thin buried oxide (UTBOX) 25 (in this example with a thickness smaller than 50 nm) is placed below the channel element 21 and above a substrate 27, referred to also as a base silicon, which may be also considered to part of the back gate element. Thus, the stack comprising the ultra-thin silicon layer 21, the UTBOX layer 25, and the base silicon layer forms a silicon on insulator (SOI) substrate. Consequently, in this example, the biochemical sensor is a dual-gate FET sensor manufactured on an ultra-thin buried oxide and body (UTBB) SOI substrate.

A third insulator 29, also referred to as a housing insulator, is provided on the outside of the device 1 and comprises for example insulating trenches or spacers to the left of the source doped region 15 and UTBOX 25 on one hand, and surrounding the back gate contact 3 on the other hand. The trenches may be made of silicon dioxide and are used for instance to isolate the device from neighbouring devices. The housing insulator 29 may also comprise on top of the trenches, which in this example reach the top surface of the back gate contact 3, a top insulating layer, which may be fabricated at a different fabrication stage than the trenches. All the three doped regions 5, 15, 19, the channel element 21 and the substrate 27 are in this example of silicon with possibly different doping levels. In FIG. 1, there are further shown biasing electrical interconnectors or vias 31, which may be used to bias the respective source, drain and gate contacts.

Thus, valid for all the embodiments in the present description, the back gate stack may be defined to comprise at least the back gate contact 3, the back gate doped region 5, the base substrate 27 and the second insulator 25. The front gate stack may be defined to comprise at least the front gate contact 7 (although this is not needed in all configurations) and the first insulator 23. Depending on the device configuration, the optional functionalisation layer may fully or partially cover the respective electrical contact 3, 5 and would thus be part of the respective gate stack.

In the above described configuration, the FET channel is fully or substantially fully depleted (no intrinsic charge carriers) at all times (constantly) to enable strong electrostatic coupling between the surface potentials at the two gate insulator/semiconductor interfaces that can be influenced by the opposite gates. More specifically, a first gate insulator/semiconductor interface (top interface) is the interface between the first dielectric layer 23 and the channel element 21, while a second gate insulator/semiconductor interface (bottom interface) is the interface between the channel element 21 and the ultra-thin buried oxide (UTBOX) layer 25. The FET channel is fully depleted and the surface potential at the front gate insulator/channel semiconductor interface and the surface potential at the back gate insulator/channel semiconductor interface are electrostatically coupled. The analytes in the solution generate a (different) surface potential at the solution/gate interface which influences the surface potential at the gate insulator/channel semiconductor interface.

The at least two independent gates in such a device can be exploited for two different functions. In the example of FIG. 1, the back gate is electrically biased to set a given operational regime of the transistor 1 (for a given source and drain biasing, ie the source and drain are configured to be electrically biased) with a given electrical conduction of the channel between the source and drain. In the configuration of FIG. 1, also the front gate may or may not be electrically biased. The front gate is arranged to be in contact with the solution such that analytes in the solution may interact with the front gate contact surface and in turn generate a surface potential change that is dependent on the concentration of the analytes in the solution. The front gate is also biased by the solution to be sensed. Due to the strong electrostatic coupling between the at least two independent gates, the resulting surface potential at the opposite gate (in this case the back gate) also depends on the concentration of the analytes in the solution. In this manner, the electrical conduction of the FET channel initially only set by the back gate biasing can be modified. The device 1 can therefore be used as a biochemical sensor without the need of an external reference electrode as is the case in FIG. 1.

Thus, according to the present invention, the principle is to use the two gates of the device 1 for two different purposes: (i) one gate bias will set a certain operational regime (for a given source and drain biasing) and (ii) the other gate is electrically floating or biased and used to electrically sense various analytes. Examples of different operational regimes or operating points of the device are: strong inversion region, moderate inversion region, weak inversion (ie subthreshold) region, depletion region, weak accumulation region, moderate accumulation region, strong accumulation region, linear region or saturation region. The preferred regime is usually, but not always, the subthreshold region. Due to the strong electrostatic coupling (in the example above achieved by the thin film SOI transistor), the analyte sensing gate is capable of altering the electrical conduction imposed by the biased gate. This principle can be applied to any types of multi-gate transistors: double-gate FETs, tri-gate FETs, FinFETs, vertical channel FETs etc, with physically separated gates and electrostatic gate coupling due to a fully depleted body.

In the above sensing device, the FET sensor transduction surface, where the chemical information is converted into an electrical signal, ie surface potential, is part of the FET gate or gate stack. In other words, the transduction surface 9 is part of the FET. In the configuration of FIG. 1, the transduction surface corresponds to the front gate contact surface facing the functionalisation layer 9. Alternatively, the transduction surface may not be part of the FET as will be explained later. In this case, the transduction surface may be spatially separated from the transistor but connected to it as will be explained later. In this scenario, the FET may be manufactured in the front-end-of-line (FEOL) fabrication process, while the sensor transduction surface may be fabricated in the back-end-of-line (BEOL) fabrication process.

As explained, the above example device configuration of the present invention leverages a dual-gate device comprising the front gate and back gate, and where the device is a fully depleted ultra-thin body, ultra-thin BOX (UTBB) FET. The ultra-thin buried oxide (BOX) layer 25 enables an efficient back gating of the FET at low voltage. By back gating is understood the connection between the back gate contact 3 and the ultra-thin BOX layer 25 through the back gate doped region 5 and the base silicon 27. In this manner, the back gate can efficiently control the conductivity of the channel between the source and drain. Unlike a FET on a thick, partially depleted SOI, where the back gating controls the conduction channel between the source and drain elements at the bottom interface, the ultra-thin Si body 15 is fully depleted and the front gate contact 7 and the back gate contact 3 are strongly electrostatically coupled. Applying a back gate (respectively front gate) voltage may shift the front gate (respectively back gate) transfer characteristics and threshold voltage of the device—up to a certain voltage beyond which this effect saturates. With such a scheme, the operating point of the sensor can be controlled and optimised for low-power operation. Furthermore, it enables to accommodate variability of the characteristics between devices.

It is to be noted that the gate stack in contact with the solution for analyte sensing can be any one of the following arrangements:
  the gate dielectric, ie no electrical contact is needed for the gate sensing the solution;
  the dielectric covered fully or partially with a functionalisation layer on top containing a probe material targeting a specific analyte;
  the dielectric covered fully or partially by the metal gate electrode; and
  the dielectric covered fully or partially by the metal gate electrode with a functionalization layer on top. Depends on the layer whether or not the metal is in contact with the solution.

Thus, considering again the FET sensor on a UTBB SOI of FIG. 1, where the front gate stack is in contact with the solution 11, the operating point of the transistor can be set via the source, drain and back gate biasing (voltage or current) to a sensitive operational regime or region of operation of the FET sensor, which typically would be the subthreshold region regime. The back gate coupling sets and controls the conductive channel between the source and drain elements. At the front gate, which is in contact with the solution, analytes within the solution interact with the gate electrode surface (eg adsorption, covalent binding, cross-linking, affinity, entrapment, charging etc) and produce a surface potential at the front gate electrode-solution interface. Due to the UTBB SOI and the strong coupling between front and back gates, this surface potential, which is a function of the concentration of analytes within the solution, acts as an extra contribution to the back gate voltage controlling the conductive channel. This results in an apparent threshold voltage $V_{th}$ change of the FET sensor. The front gate is electrically biased (although a configuration with no front gate biasing is also possible) and no reference electrode is needed in this configuration (reference electrode-free configuration).

Figure 2:
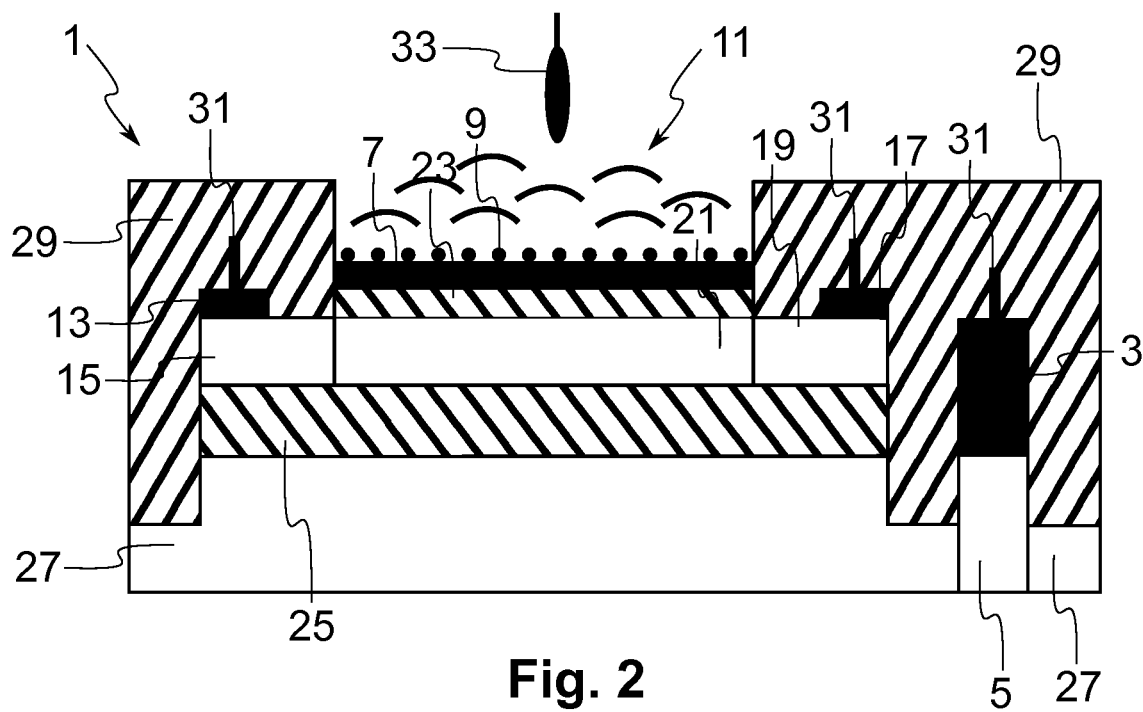
FIG. 2 is a simplified cross-sectional view of a biosensor according to a second embodiment of the present invention.

The configuration of FIG. 2 illustrates the second embodiment of the present invention. This embodiment is very similar to the first embodiment of FIG. 1. However, according to this embodiment, a reference electrode 33 is used to bias, optionally at a fixed voltage value, the liquid contacting the front gate stack. Furthermore, no direct biasing of the front gate contact 7 is used in this variant. Thus, there is no need to have a biasing connector 31 for the front gate contact 7.

Figure 3:
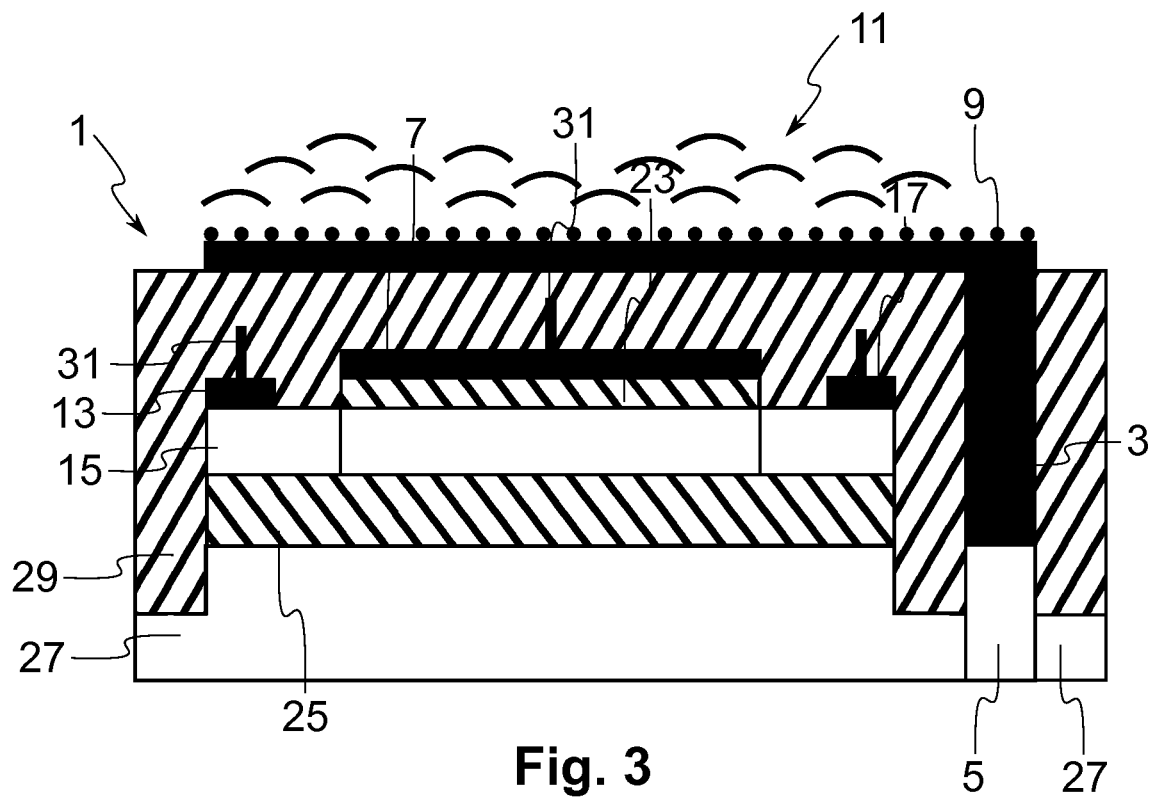
FIG. 3 is a simplified cross-sectional view of a biosensor according to a third embodiment of the present invention.

It is to be noted that the roles of the front and back gates may be inverted. In this case, the operating point of the transistor can be set via the source, drain and front gate biasing. The front gate coupling sets and controls the conductive channel between source and drain doped regions 15, 19 and the back gate stack is in contact with the solution 11. This is the third embodiment of the present invention as shown in FIG. 3. It is to be noted that the electrical contact 3 of the back gate is usually not arranged via the back side (bottom) of the SOI substrate (due to the thickness of the base silicon and the parasitics notably) but it is arranged through the front (top) side as is the case also in the configuration of FIG. 3. During the fabrication process, a hole is etched through the BOX layer 25 of the SOI substrate in the location where the back gate contact should be placed and a (metal) plug contact is then formed to provide the electrical contact 3. Such a plug contact to the back gate may provide a metal surface (functionalised if need be), which is in contact with the solution 11. In other words, the device fabrication process starts with an SOI substrate which is as mentioned a stack of base silicon layer/BOX layer/top silicon layer. At some point of the fabrication process, a hole is etched in the BOX layer 25 to make an electrical contact from the top side to the base silicon. The hole is filled with metal or (doped) silicon with a metal pad deposited on top for instance. The insulating trench around the back gate contact 3 is made through a local oxidation process or by etching and filling with an oxide.

As previously, the analytes produce a surface potential variation on the back gate contact 3, which acts as an extra contribution to the front gate voltage controlling via electrostatic coupling the opposite surface potential between the semiconductor and the gate dielectric, and, therefore, the conduction channel and resulting in an apparent threshold voltage $V_{th}$ change of the FET sensor 1. In this example, the back gate contact 3 is electrically floating and no reference electrode is needed in the solution to bias at a fixed voltage value the liquid 11 contacting the gate stack.

Furthermore, in the configuration of FIG. 3, the sensitive surface, ie the transduction surface, of the back gate where the initial biochemical to electrical transduction occurs and the functionalisation layer 9 on top of it are not part of the FET. In this case, the transduction surface (ie the whole horizontal longitudinal back gate metal contact surface facing the functionalisation layer 9) is on the outside of the transistor and is spatially separated from the internal elements of the transistor, such as the front gate stack. The transduction surface is however interconnected with the transistor. With such an approach, the transistor front-end may be manufactured in the FEOL process using standard CMOS fabrication processes. The sensitive transduction surface of the device 1, which may involve multiple (non-CMOS compatible) biochemical surface functionalisation layers in order to detect multiple analytes, may be engineered and fabricated in the BEOL process.

Figure 4:
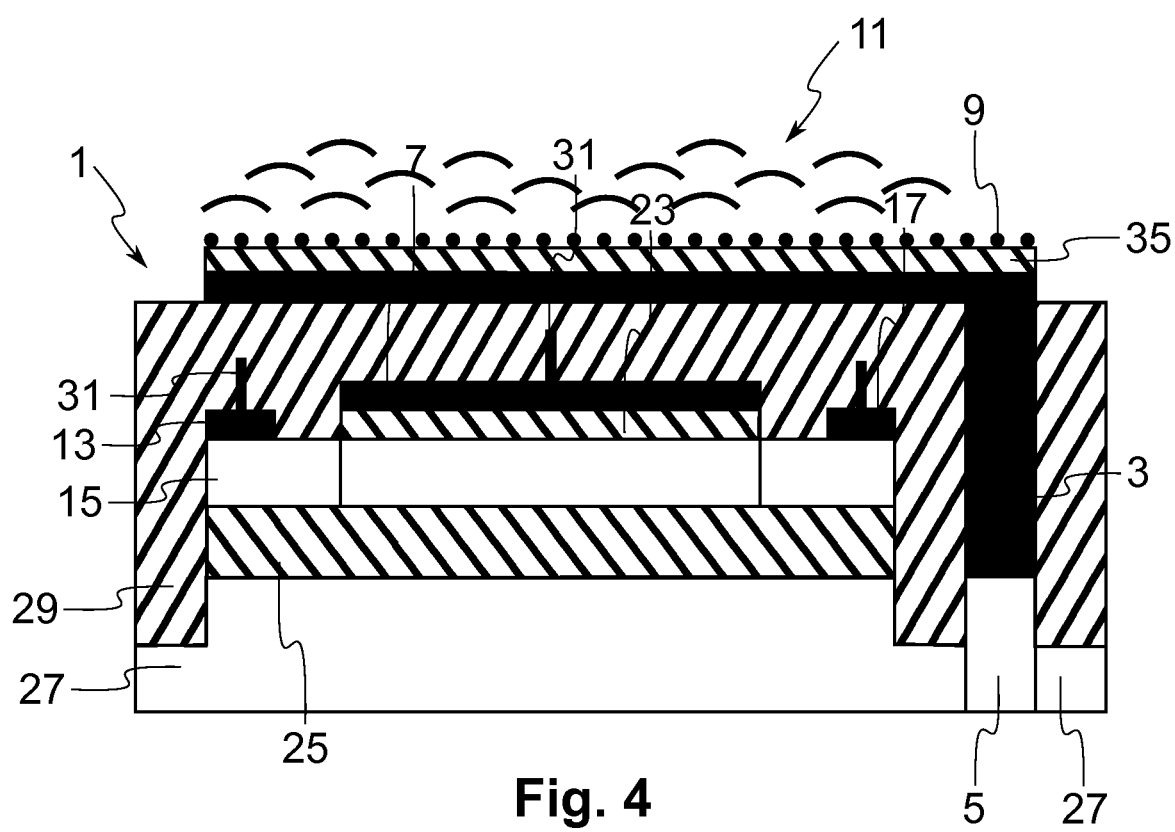
FIG. 4 is a simplified cross-sectional view of a biosensor according to a first variant of the third embodiment of the present invention.
Figure 5:
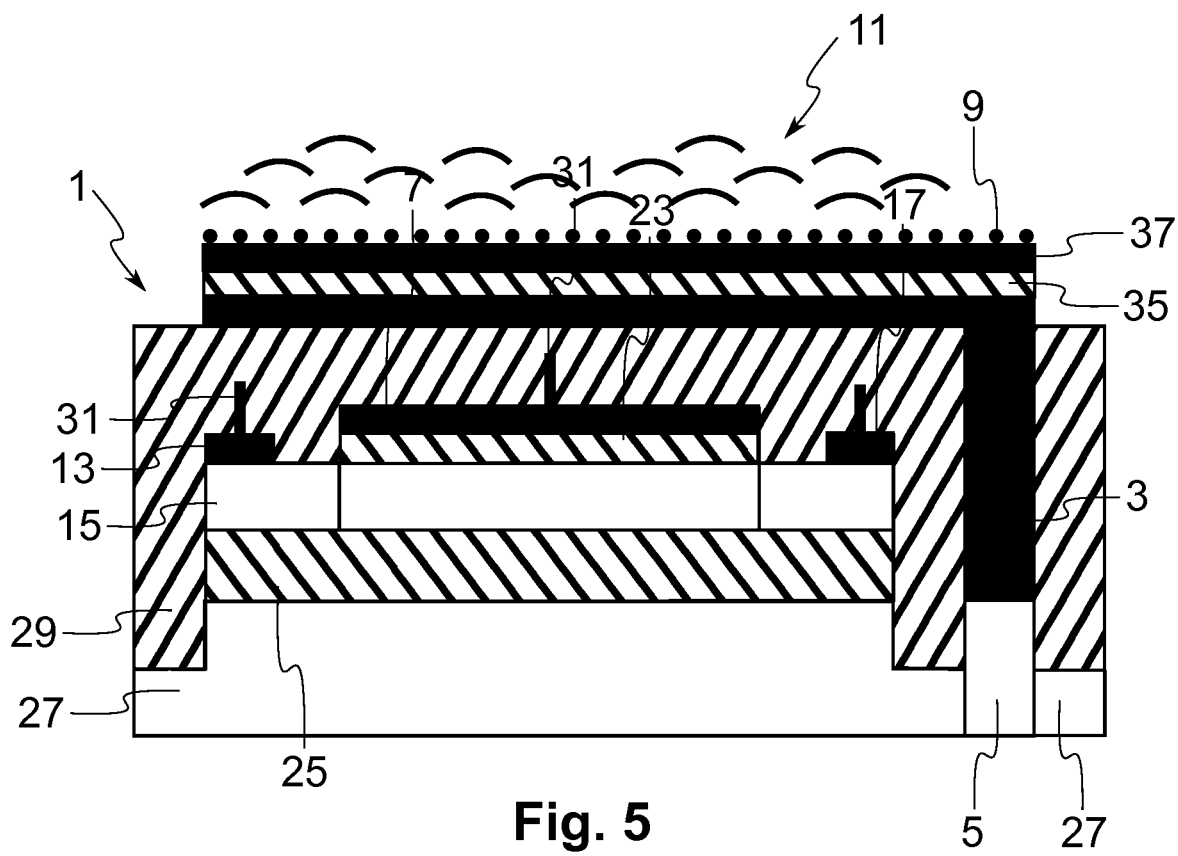
FIG. 5 is a simplified cross-sectional view of a biosensor according to a second variant of the third embodiment of the present invention.

FIGS. 4 and 5 show further variants of the third embodiment. In the variant of FIG. 4, instead of consisting of a plain metal surface with or without a functionalisation layer on the top, the sensitive surface consists of a metal-dielectric stack with or without a functionalisation layer 9 on the top. In other words, in this variant, a dielectric layer 35 is placed on the metal contact 3 of the back gate. In the variant of FIG. 5, a metal layer 37 is placed on top of the dielectric layer 35. Thus, in this case, the sensitive surface consists of a metal-dielectric-metal stack, forming a capacitor, with or without a functionalisation layer 9 on the top. In this variant, analytes interact with the surface of one plate of a capacitor that plays the role of the sensitive surface and biases in turn the back gate of the transistor.

Figure 6:
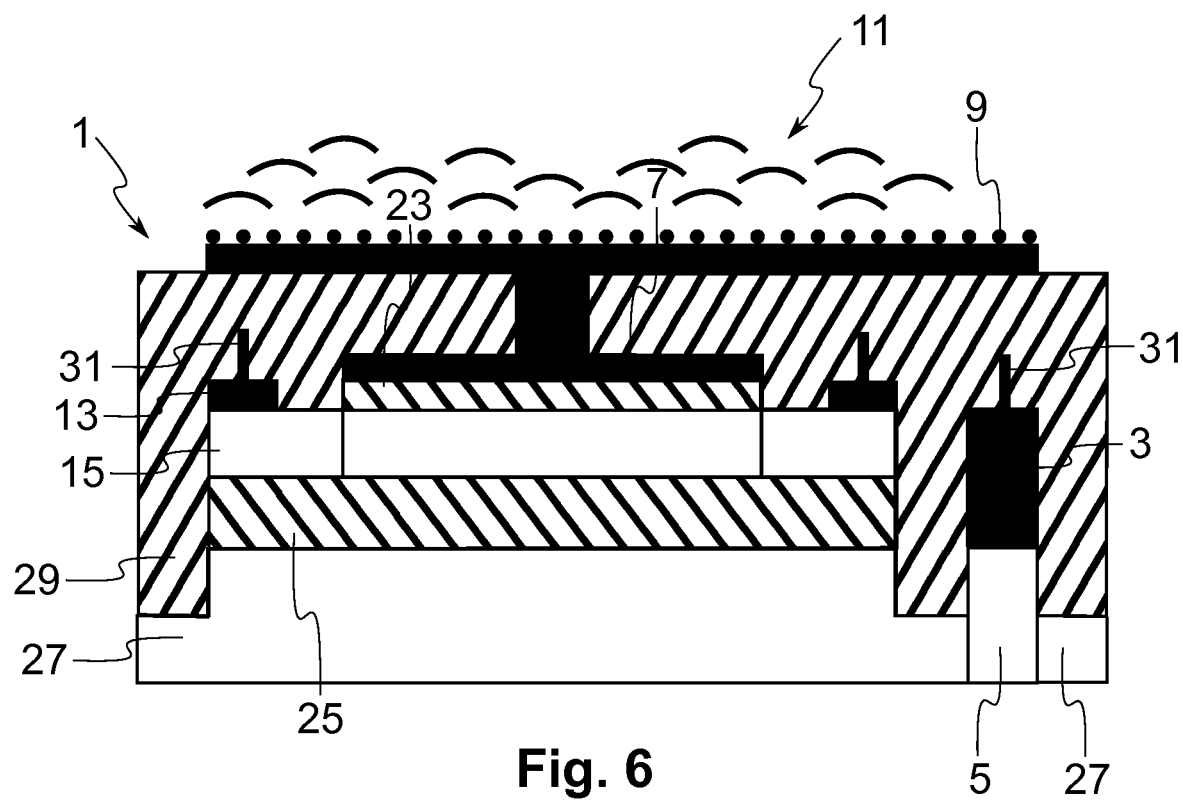
FIG. 6 is a simplified cross-sectional view of a biosensor according to a fourth embodiment of the present invention.

FIG. 6 illustrates the fourth embodiment of the present invention. Compared to the third embodiment, the difference is that in this embodiment, the front gate contact 7 is in contact with the solution. In other words, the separation of the transistor and the sensitive surface is readily transposable to the configuration of FIG. 6, where the front gate 3 is in contact with the solution. In this case, there is a through hole in the third insulator 29 for the front gate contact 7 to pass through it to reach the top surface of the first dielectric layer 23. The front gate metal contact 7 forms a substantially flat longitudinal contact below the functionalisation layer 9.

The above-described biosensors may be used in various applications, such as in wearable sensors or lab-on-a-chip devices, which integrate one or several laboratory functions on a single integrated circuit, or lab-on-skin devices, which may analyse biomarkers in sweat for example. The detected data may then be transferred to a data processing device, such as a smartphone, for further processing and/or for showing the data to a user. The sensor 1 itself may be very small, for example the largest dimension may be less than one cm. Furthermore, in the present description a thin or ultra-thin element is understood to have a cross-sectional thickness of less than 100 nm, and possibly even less than 50 nm or even less than 10 nm. In the figures, the thickness of an element is thus understood to be the distance between a top surface and a bottom surface.

While the invention has been illustrated and described in detail in the drawings and foregoing description, such illustration and description are to be considered illustrative or exemplary and not restrictive, the invention being not limited to the disclosed embodiments. Other embodiments and variants are understood, and can be achieved by those skilled in the art when carrying out the claimed invention, based on a study of the drawings, the disclosure and the appended claims. For example, it is possible to combine teachings of any of the embodiments to obtain further embodiment or variants. Furthermore, the invention also relates to a method operating the biosensor for sensing a solution as described above.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A biosensor comprising:
a source element;
a drain element;
a semiconductor channel element comprising a front side and a back side, and arranged between the source element and the drain element for forming an electrically conductive channel with adjustable conductivity between the source and drain elements, the semiconductor channel element having a thickness of less than 100 nm;
a back gate element comprising a back gate electrical conductor and a back gate doped region;
a front gate element comprising a front gate electrical conductor, physically separate from the back gate element;
a base substrate connected to the back gate doped region, the base substrate is on opposing lateral sides of the back gate doped region in a cross section, and the base substrate and back gate doped regions have different doping levels; and
a buried oxide layer arranged between the back side of the semiconductor channel and the base substrate, the buried oxide layer having a thickness of less than 100 nm, the buried oxide layer, the base substrate, the back gate doped region and the back gate electrical conductor being arranged so as to allow back gating of the back gate electrical conductor to the buried oxide layer,
wherein one of the back gate element or the front gate element, referred to as a sensing gate element, is configured to be in contact with a solution comprising analytes allowed to interact with a gate contact surface of the sensing gate element to generate a surface potential change dependent on the concentration of the analytes in the solution, wherein at least the other one of the back gate element and front gate element is configured to be electrically biased to set a given operating point of the sensor with given electrical conductivity of the channel, wherein the channel element is fully depleted, and wherein the back and front gate elements are electrostatically coupled such that the surface potential change at the sensing gate element is configured to modify the electrical conductivity of the channel.

2. The biosensor according to claim 1, wherein the front gate element is configured to be electrically biased.

3. The biosensor according to claim 1, wherein the front gate element is configured to be electrically floating.

4. The biosensor according to claim 1, wherein the biosensor comprises a reference electrode in the solution, and configured to be electrically biased, the solution being in contact with the front gate element, and wherein the back gate element is also configured to be electrically biased to shift the transfer characteristics, threshold voltage and/or operating point of the sensor set by the reference electrode and the front gate element.

5. The biosensor according to claim 1, wherein the biosensor does not comprise a reference electrode in the solution.

6. The biosensor according to claim 1, wherein the biosensor further comprises a housing insulator, and wherein the majority of the surface area of the front gate element is entirely enclosed by the housing insulator.

7. The biosensor according to claim 6, wherein the electrical conductor of the back gate element extends through a hole in the housing insulator to reach an outer surface of the housing insulator.

8. The biosensor according to claim 7, wherein the electrical conductor further extends horizontally, when the biosensor is placed on a flat horizontal surface, along the outer surface of the housing insulator.

9. The biosensor according to claim 1, wherein the sensing gate element comprises a metal-dielectric layer stack to form a transduction surface.

10. The biosensor according to claim 1, wherein the sensing gate element comprises a metal-dielectric-metal layer stack to form a transduction surface.

11. A wearable device comprising the biosensor according to claim 1.

12. A method of fabricating the biosensor according to claim 1, wherein the biosensor comprises a multi-gate transistor comprising the back gate element and front gate element, and a transduction surface connected to the transistor and in contact with the solution, the method comprising fabricating the transistor in a front-end-of-line process; and fabricating the transduction surface in a back-end-of-line process separated in time from the front-end-of-line process.

\* \* \* \* \*